United States Patent [19]
Rozman

[11] Patent Number: 5,029,263
[45] Date of Patent: Jul. 2, 1991

[54] ELECTRIC START CONTROL OF A VSCF SYSTEM

[75] Inventor: Gregory I. Rozman, Rockford, Ill.

[73] Assignee: Sundstrand Corporation, Rockford, Ill.

[21] Appl. No.: 423,941

[22] Filed: Oct. 19, 1989

[51] Int. Cl.$^5$ .................................. H02P 1/46
[52] U.S. Cl. .................................. 318/714; 318/254; 318/430; 318/438
[58] Field of Search ............... 318/138, 254, 430, 431, 318/437, 438, 714, 715, 716, 719, 721, 722, 724, 798, 799, 800, 801

[56] References Cited

U.S. PATENT DOCUMENTS

| | | | |
|---|---|---|---|
| 4,085,355 | 4/1978 | Fradella | 318/721 X |
| 4,125,796 | 11/1978 | Nagase et al. | 318/716 X |
| 4,172,991 | 10/1979 | Akamatsu et al. | 318/722 |
| 4,223,261 | 9/1980 | White | 318/722 X |
| 4,230,979 | 10/1980 | Espelage et al. | 318/721 |
| 4,295,085 | 10/1981 | Lafuze | 318/254 |
| 4,320,331 | 3/1982 | Plunkett | 318/722 |
| 4,364,004 | 12/1982 | Bourbeau | 318/721 |
| 4,418,308 | 11/1983 | Bose | 318/803 |
| 4,427,934 | 1/1984 | Tupper | 318/723 |
| 4,546,293 | 10/1985 | Peterson et al. | 318/138 X |
| 4,608,527 | 8/1986 | Glennon et al. | 318/723 X |
| 4,651,068 | 3/1987 | Meshkat-Razavi | 318/254 |

OTHER PUBLICATIONS

SAE Technical Paper Series No. 871887, D. E. Baker (Oct. 5-8, 1987).

*Primary Examiner*—Bentsu Ro
*Attorney, Agent, or Firm*—Wood, Phillips, Mason, Recktenwald & VanSanten

[57] ABSTRACT

The problem of providing aircraft engine starting is solved with an engine start control apparatus operating a generator (12) as a synchronous motor. The motor (12) receives power from a main inverter (46) and an excitation inverter (48) through an exciter (14) operating as a rotary transformer. These inverters (46, 48) are controlled by a control unit (22) which provides for constant power characteristics in the field weakening range. The control unit (22) includes a pulse width modulation (PWM) generator (100) which is responsive to a voltage command (102) and a commutation command (104) to develop switching signals (88) for controlling the switches (S1–S6) in the main inverter (46). The voltage command (102) is used to vary the duty cycle of the PWM signals. The commutation angle command (104) is used to control the timing of the PWM signals. The voltage command (102) and the commutation angle command (104) are controlled using closed loop current control.

2 Claims, 6 Drawing Sheets

ELECTRIC START CONTROL OF A VSCF SYSTEM

FIELD OF THE INVENTION

This invention relates to electrical power systems and, more particularly, to a dual mode control system therefor including a generate mode of operation and a start mode of operation.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power using a variable speed constant frequency (VSCF) system including a power converter which may develop, for example, 115/200 $V_{ac}$ power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Rozman et al. copending application No. 270,625 entitled "VSCF Start System With Selectable Input Power Limiting", assigned to the assignee of the present invention, discloses a start control system for a brushless DC machine which is operable to maintain constant motor current and thus control input power. Specifically, as disclosed therein, a start system is used for starting an engine using a brushless synchronous generator operating as a motor. The motor receives power from a main inverter and an excitation inverter. These inverters are controlled by a GCCU which provides for current control and constant power characteristics in the field weakening range. The control unit includes a pulse width modulation (PWM) generator which is responsive to a voltage command and a commutation angle command to develop switching signals for controlling the switches in the main inverter. The voltage command has a level corresponding to rotor speed plus a boost voltage to offset the IR drop of the machine at low speeds. In fact, the voltage command is selected to maintain a constant volt/hertz ratio. The voltage command is used to vary the duty cycle of the PWM signals.

The solution described in the copending Rozman et al. application utilized open loop voltage control. Motor armature current is controlled by varying the commutation angle. Such an arrangement limits the range of motor armature current control, specifically at low speed.

The present invention is intended to overcome one or more of the problems as set forth above.

SUMMARY OF THE INVENTION

In accordance with the present invention, a start control system for a brushless DC machine provides motor armature current closed loop control by varying both motor terminal voltage and torque angle.

Specifically, in the constant torque mode the current is controlled by the motor terminal voltage, while in the constant power mode, the current is controlled by the torque angle. A switching arrangement is used to provide smooth transition between the two modes of operation.

Broadly, there is disclosed herein a control system for a brushless DC machine having a rotor and a stator having a stator coil which is controllably energized from a source of DC power defining a positive and negative DC voltage for imparting rotation to the rotor. The control system includes means for sensing the rotational position of the rotor, and switching means coupled between the source of DC power and the stator coil for alternately applying the positive and negative voltage to the coil according to the rotational position of the rotor. Means are provided for developing a stator current reference signal representing a desired stator current, and also means for generating an actual stator current signal representing actual current level through the stator coil. Control means are coupled to the developing means, the generating means and the switching means for modifying a duty cycle of the switching means for applying the positive and negative voltages to the coil according to the difference between the desired and actual stator current level to maintain the stator current at the desired level.

The disclosed start system is used for starting an engine using a brushless synchronous generator operating as a motor. The motor receives power from a main inverter and an excitation inverter. The inverters are controlled by a control unit which provides for current control and also constant power operation in the field weakening range.

The control unit includes a pulse width modulation (PWM) generator which is responsive to a voltage command and a commutation angle command to develop switching signals for controlling the switches in the main inverter. The voltage command represents a compensated motor armature current error level. The voltage command is used to vary the duty cycle of the PWM signals.

According to another aspect of the invention, the control means includes means for modifying the rotational position at which the positive and negative voltages are applied to the coil in accordance with a compensated error signal, above a select duty cycle level.

Particularly, the commutation angle command represents the sum of a select minimum commutation angle command level and a compensated armature current error signal. However, the compensated current error is selectively utilized only when the duty cycle is above a select minimum level, for example, 0.9. The current error is multiplied by the duty cycle in order to provide smooth transition.

The motor armature current reference level is fixed. At start, the actual motor armature current is zero. Therefore, in a constant torque mode of operation, the duty cycle gradually increases from 0 to 1.0, and the commutation angle command is selected in accordance with the select minimum value. In the constant power mode, the duty cycle is approximately 1.0. When the motor approaches the constant power mode, as determined by a duty cycle detector, the compensated current error is summed with the select minimum commutation angle so that the commutation angle command is determined using closed loop current control. Thus, closed loop control is used in both the constant torque mode to control voltage and the constant power mode to control commutation angle and thus maintain constant power in association with field weakening control.

It is still another feature of the present invention that the motor is operated at a unity power factor to avoid excessive reactive power flow which would otherwise create heating losses in the motor and converter. Specifically, the magnitude of the field excitation is controlled to satisfy unity power factor requirements. Accordingly, constant power characteristics are provided in the field weakening range.

Further features and advantages of this invention will readily be apparent from the specification and from the drawings.

DESCRIPTION OF THE INVENTION

Figure 1:
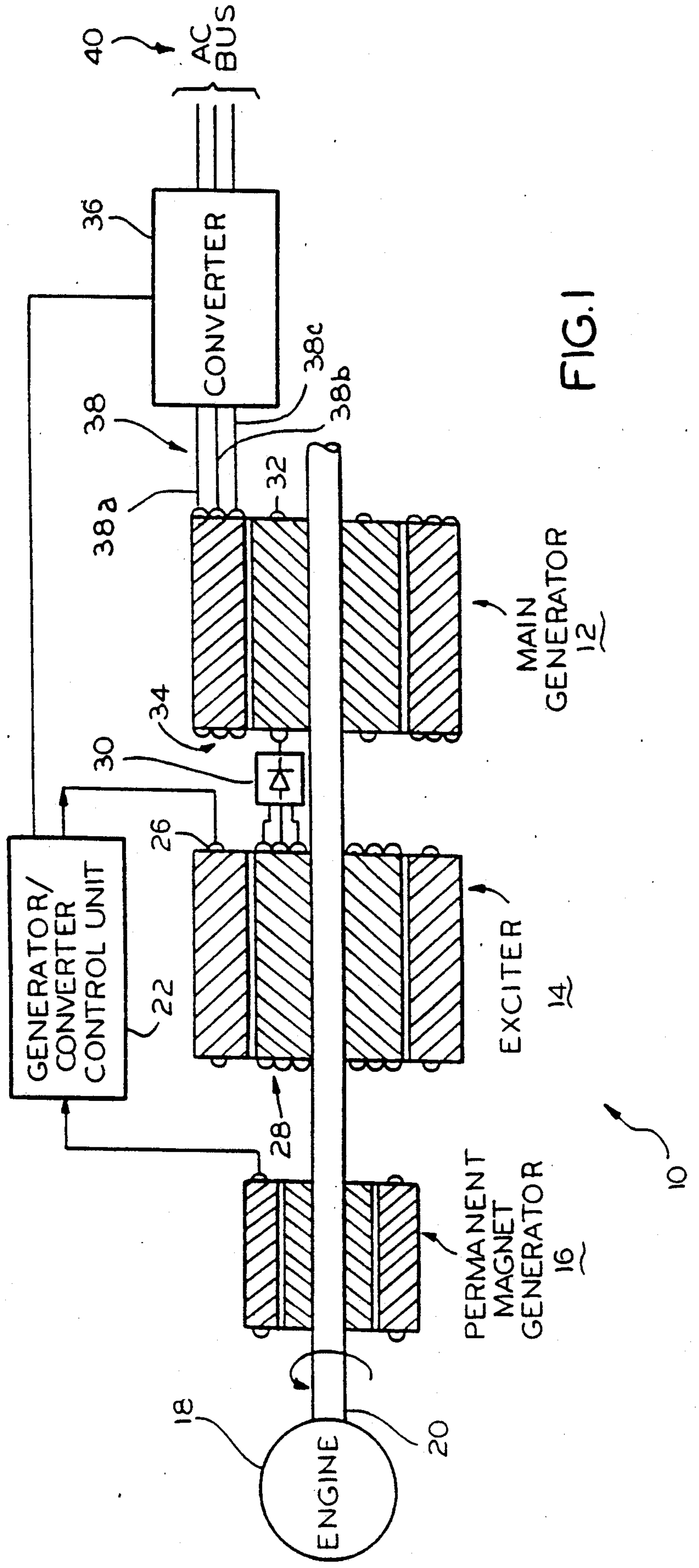
FIG. 1 is a combined diagrammatic illustration-block diagram of an electrical system incorporating the start system of the present invention.

Referring first to FIG. 1, an electrical power system 10 includes a main generator 12, an exciter 14 for providing main field current to the generator 12 and a permanent magnet generator (PMG) 16. Each of the main generator 12, exciter 14 and PMG 16 are driven by an engine 18 through a common shaft 20.

A generator/convertor control unit (GCCU) 22 receives the power developed by the PMG 16 and delivers a controlled current to a DC field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings 34. The stator windings 34 develop polyphase output power which is delivered to a converter 36 over a bus 38 comprising at least three conductors 38*a*, 38*b*, and 38*c*.

In a typical application, the engine 18 is the main engine in an aircraft, and the converter 36 is part of a variable speed constant frequency (VSCF) system for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
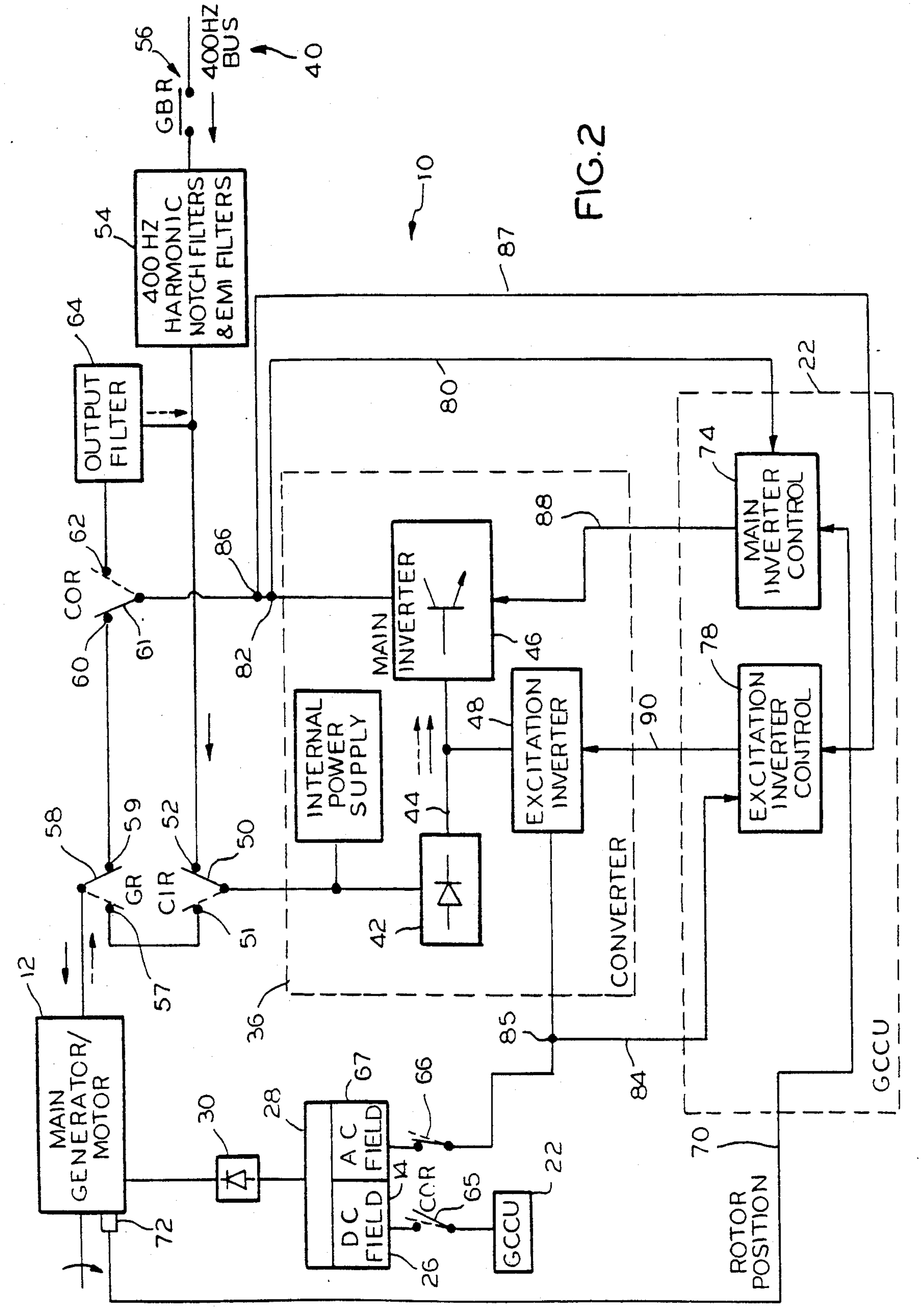
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link 44 to a DC/AC converter 46. Particularly, according to the illustrated embodiment of the invention, the AC/DC converter 42 comprises a full wave bridge rectifier circuit of conventional construction which is operable to convert three phase AC power to DC power. The DC link 44 includes a conventional filter. The DC/AC converter 46 comprises a main inverter circuit, described more specifically below relative to FIG. 4. The converter 36 also includes an excitation inverter 48 connected to the DC link 44 for developing AC power for the motor field during the start mode of operation, as discussed below.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) contact 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the armature windings 34 shown in FIG. 1. The second fixed contact 59 is connected to a first fixed contact 60 of a converter output relay (COR). The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter field winding 26 to the GCCU 22. The second switch 66 connects the excitation inverter 48 to an AC start field winding 67 of the exciter 14. Specifically, the excitation for the wound field main generator/motor 12 cannot be supplied at zero speed by the exciter 14. Accordingly, the start field winding 67 powered by the excitation inverter 48 operates with the exciter armature winding 28 as a rotary transformer. Specifically, AC power delivered to the exciter AC field winding 67 develops corresponding AC power in the armature windings 28 for powering the motor field winding 32.

During engine start, the relays GR, CIR and COR are operated as shown in solid line in FIG. 2. Conversely, in the generate mode, these relays GR, CIR and COR are operated as shown dashed lines in FIG. 2.

Although the relays GR, CIR and COR are shown as providing a single line connection, each of the relays is provided with suitable switches to switch three phase power, as is well known.

The GCCU 22 includes a main inverter control 74 and an excitation inverter control 78. The main inverter control 74 receives a rotor position signal on a line 70 from a rotor position sensor 72 associated with the main generator 12. The position sensor 72 may be, for example, a conventional resolver. The main inverter control also receives an armature current signal on a line 80 from a current sensor 82 which senses output current from the main inverter 46. The main inverter control 74 develops base drive commands on a line 88 for controlling the main inverter 46. The excitation inverter control 78 receives a start exciter current signal on a line 84 from an excitation inverter current sensor 85 and a reactive power signal on a line 87 from a reactive power detector 86. The excitation inverter control 78 develops base drive commands on a line 90 for driving the switches of the excitation inverter 48.

In the generate mode of operation, with the relay contacts GR, CIR and COR as illustrated in dashed lines, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the main inverter 46 which converts the power to AC power of constant frequency. The constant frequency AC power from the main inverter 46 is delivered through the CIR relay movable contact 61 to the second fixed contact 62, through the output filter 64, and the filter 54 to the AC bus 40. Field power is developed by the exciter 14 which receives DC power to the DC field winding 26 through the first field control switch 65.

In the start mode of operation, the relays GR, CIR and COR are controlled so that their contacts are positioned as shown solid lines. Particularly, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the armature windings 34 of the main generator/motor 12. Field power to the main generator 12 is provided from the exciter 14 operating as a rotary transformer powered by the excitation inverter 48 through the second COR field control switch 66 to the AC field winding 67.

Figure 3:
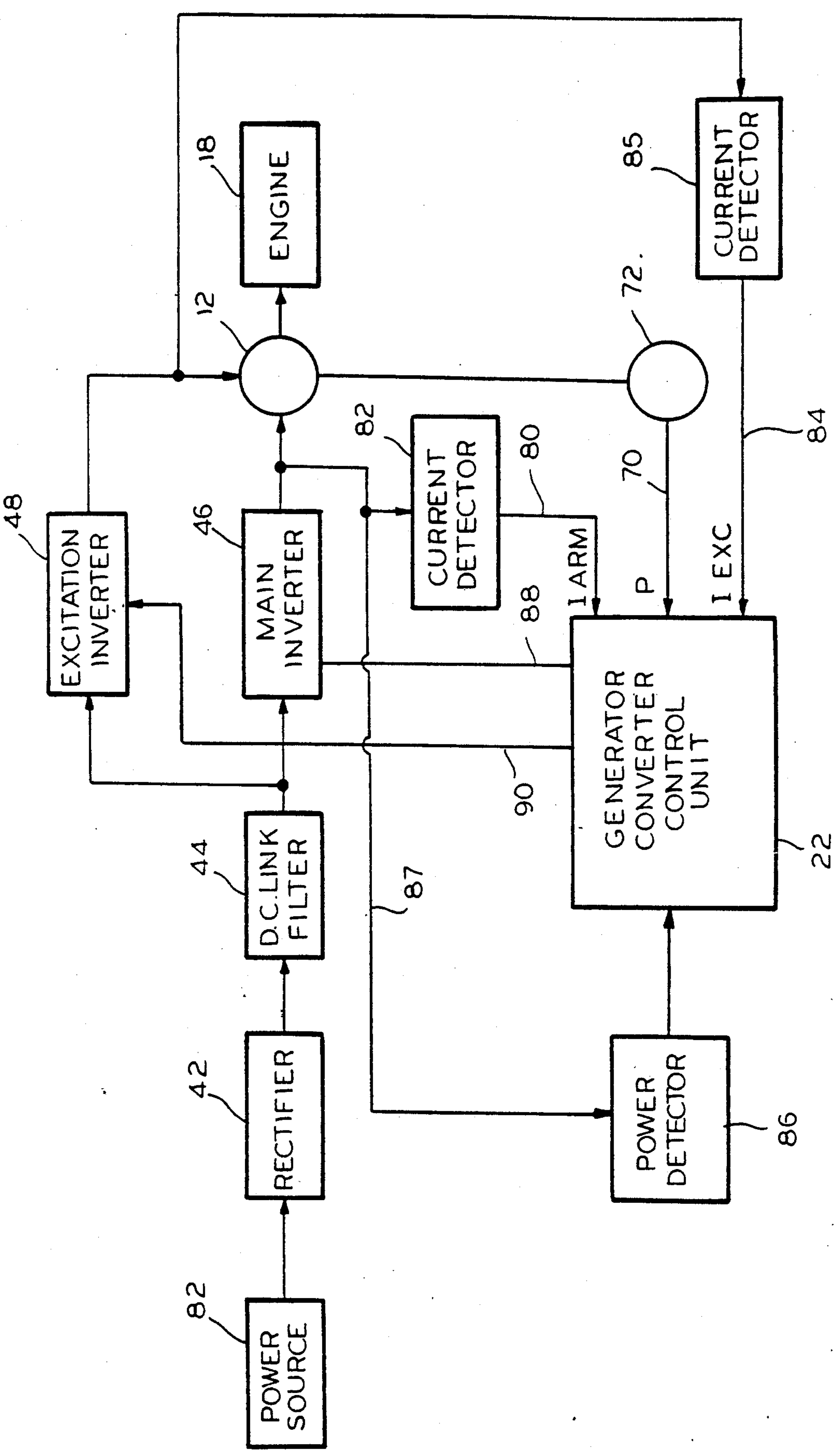
FIG. 3 is a block diagram of the control system specifically illustrating the start mode of operation.

Referring now to FIG. 3, a simplified block diagram representation more specifically illustrates the operation of the electrical power system 10 according to the invention in the start mode of operation, as discussed immediately above. A power source 82 is coupled to the rectifier 42 which is coupled through the DC link filter 44 to both the main inverter 46 and the excitation inverter 48. The reactive power detector 86 senses output power from the main inverter 46 and develops the signal on the line 87 to the GCCU 22. The GCCU 22 receives the armature current signal on the line 80 from a current detector 82 which senses current from the main inverter 46 to the motor 12; the position signal on the line 70 from the rotor position sensor 72 and the excitation current signal on the line 84 from the current detector 85. As discussed above, the GCCU 22 develops the base drive commands for the main inverter 46 on the line 88 and the base drive commands for the excitation inverter 48 on the line 90.

Figure 4:
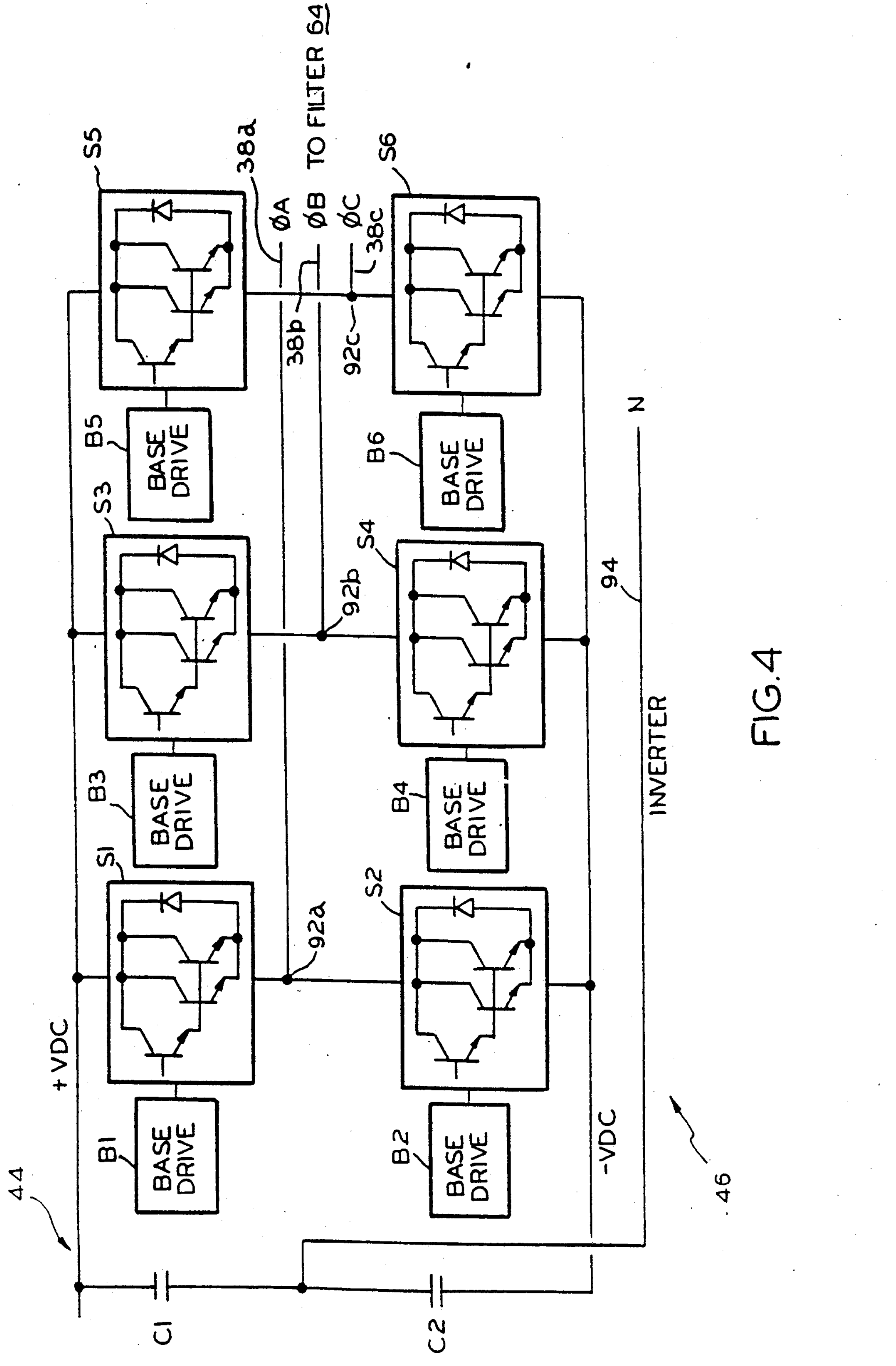
FIG. 4 is a schematic diagram illustrating the main inverter of FIG. 3.

Referring to FIG. 4, a schematic diagram illustrates one alternative circuit for the main inverter 46. Particularly, the main inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner. The switch circuits S1–S6 are connected between the plus voltage DC rail and the minus voltage DC rail of the DC link 44. The 3-phase armature windings 34 of the main generator 12 are connected by the lines 38*a*–38*c*, respectively, to junctions 92*a*–92*c* between pairs of series-connected switch circuits S1–S6. A neutral line 94 to the main generator 12 is connected at a junction between filter capacitors C1 and C2 across the DC link 44.

Although not shown, the excitation inverter 48 may be of generally similar construction to the main inverter 46 illustrated in FIG. 4. Alternatively, other circuits may be utilized for either or both of the main inverter 46 and the excitation inverter 48, as is well known.

Figure 5:
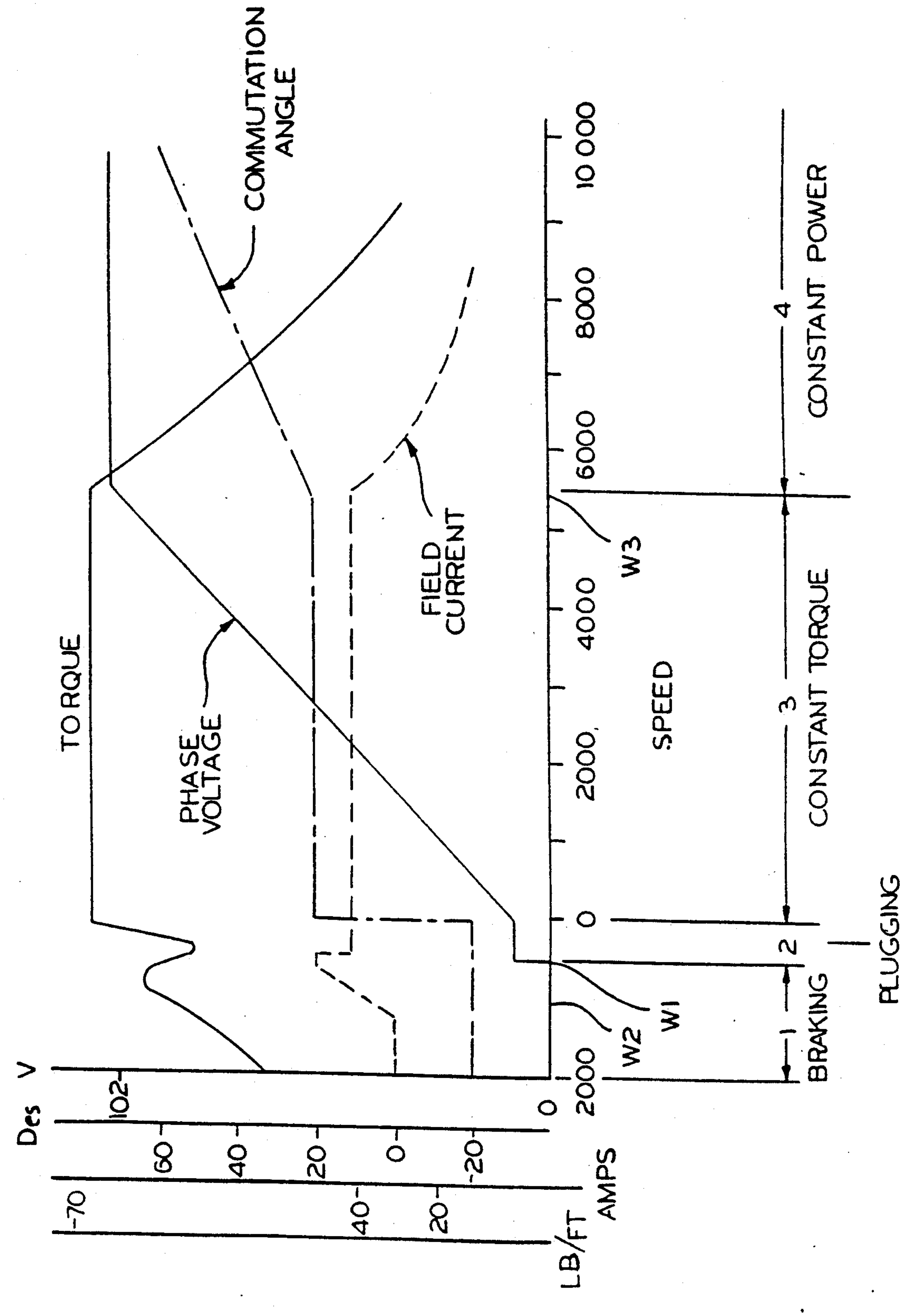
FIG. 5 is a series of curves illustrating the desired speed relationship of various motor operation parameters according to the start control of the invention.

With reference to FIG. 5, a series of motor parameter curves generally illustrate desired motor operation during the start mode as implemented by the control according to the invention. Specifically, the start mode includes four control modes of operation —namely, (1) braking, (2) plugging, (3) motoring with constant torque, and (4) motoring with constant power.

The braking mode occurs during windmilling when the engine shaft 20, see FIG. 1, spins in the opposite direction. At speeds more negative than $W_1$, the motor armature windings 34 are shorted to provide a braking effect. The armature current is limited by a preset value of the field current which is kept constant below speed $W_2$, and then increased inversely proportional to speed. The plugging mode is a transition mode between the braking and motoring modes and occurs between speed $W_1$ and zero. The field current is reduced for constant torque operation, and the armature voltage is increased. The commutation angle, discussed more specifically below, is held constant and it is selected to provide an acceptable stator current. The commutation angle represents the phase advance which is the angle between the applied field and the rotor position.

A constant torque motoring mode occurs at speeds between zero and $W_3$. In this mode, constant torque is achieved by maintaining the air gap flux constant. The air gap flux is held constant by controlling current which in effect controls voltage. The field current is controlled to provide unity power factor motor operation. Specifically, the commutation angle command is set to a constant level. Voltage is a function of armature current multiplied by synchronous impedance, which changes with speed. It is desirable to maintain the armature voltage to speed ratio at a constant. As a result, current is a function of armature voltage which is divided by speed multiplied by the synchronous reactance. Therefore, as speed increases the voltage must also increase to maintain constant current. If current is maintained constant, then torque is also constant.

Beyond the base speed, i.e., 1.0 per unit speed, the motor operates in constant horsepower mode and the maximum torque decreases as the volts/hertz ratio decreases. The field is controlled to maintain unity power factor at the machine terminal. If the motor is not operating at unity power factor, then current is recirculating in the motor windings, and is therefore non-functional. Also, reactive power flow creates heating losses in the motor and converter. In order to maintain unity power factor the field current is reduced. This is commonly referred to as field weakening, which is associated with constant power operation. However, by reducing field current the torque decreases by the square of changes in speed. To compensate, the commutation angle is increased. By firing the inverter switches sooner, known as phase advance, a field is created which leads the rotor. A change in phase advance is accomplished by changing the commutation angle, resulting in a similar change in torque angle. Thus by controlling commutation angle and utilizing field weakening, the armature current, and thus also power, is maintained constant.

Figure 6:
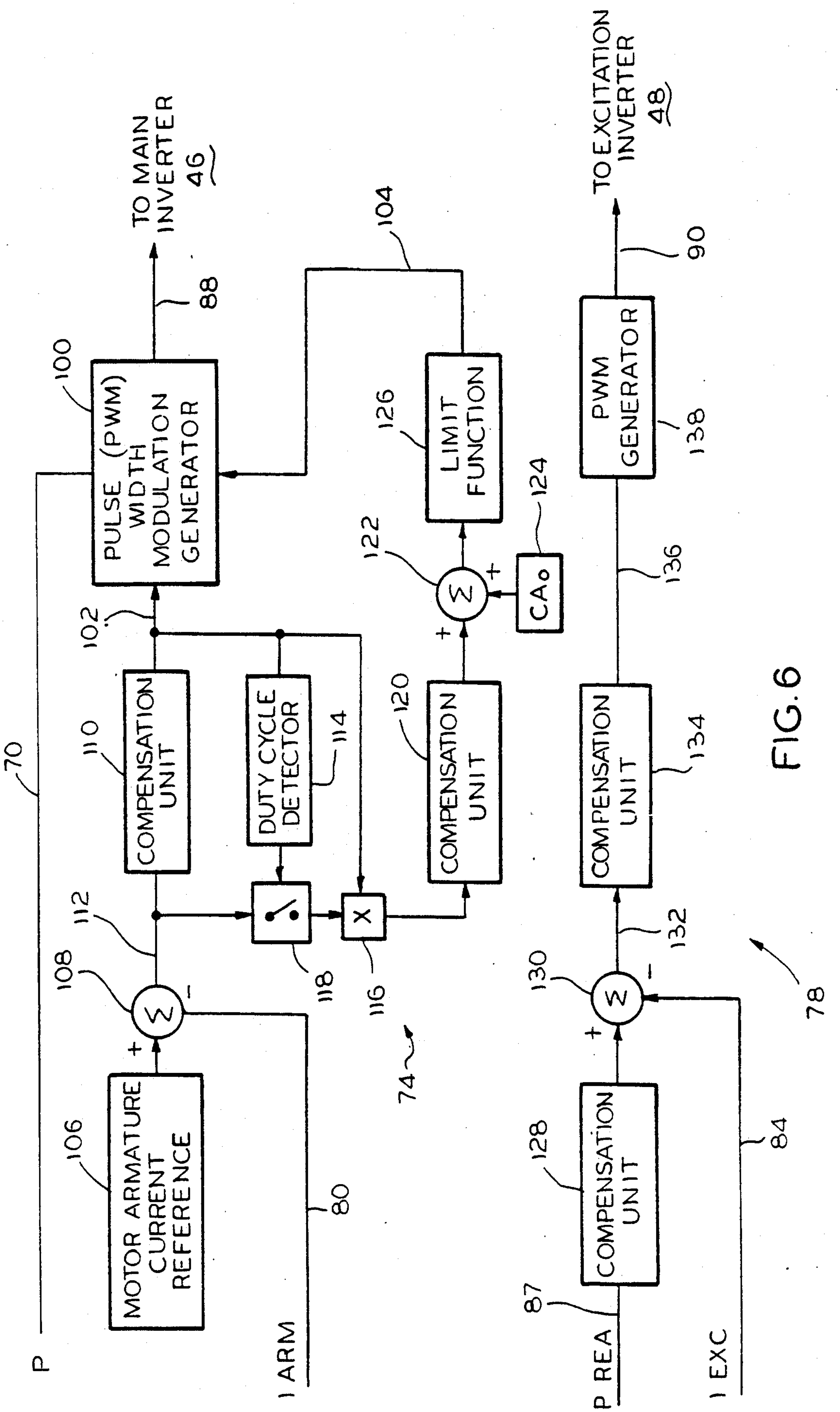
FIG. 6, is a detailed block diagram of the generator/convertor control unit (GCCU) of FIG. 3.

The above described constant torque and constant power motoring modes of operation are achieved with the GCCU 22 illustrated in block diagram form in FIG. 6, including the main inverter control 74 and the excitation inverter control 78, see FIG. 2.

The main inverter control 74 includes a pulse width modulation (PWM) generator 100. The PWM generator 100 receives the position signal on the line 70, a voltage command on a line 102, and a commutation angle command on a line 104. The PWM generator 100 derives the base drive commands which are transferred on the line 88 to the base drive circuits B1-B6 of the main inverter 46, see FIG. 4. The PWM generator 100 may be of any conventional construction. Particularly, the PWM generator 100 develops base drive signals to control the output voltage of the main inverter 46, by varying the duty cycle of the PWM signals. The duty cycle is proportional to the voltage command received on the line 102. The fundamental frequency of the inverter output is determined by motor speed. The output waveforms are synchronized to the rotor position as determined by the sensor 72, see FIG. 3. The phase difference between rotor position and inverter output is adjusted in accordance with the commutation angle command on the line 104.

The main inverter control 74 develops the voltage command on the line 102 utilizing a motor armature current reference 106, a first summer 108 and a compensation unit 110. The first summer 108 receives the motor armature current reference 106 and the actual motor armature current signal on the line 80 from the sensor 82, see FIG. 3. The output of the first summer 108 is a current error signal on a line 112 representing the difference between the motor armature current reference and the actual motor current. The current error on the line 112 is applied to the compensation unit 110. The compensation unit 110 provides stability in controlling current by utilizing, for example, a proportional and integral control algorithm. The output of the compensation unit 110 controls the duty cycle of the PWM generator 100.

The voltage command on the line 102 is also applied to a duty cycle detector 114 and a multiplier 116. The duty cycle detector operates a switch 118 which connects the output of the first summer 108 with the multiplier 116. The output of the multiplier 116 is applied to a compensation unit 120. The output from the compensation unit 120 represents a desired commutation angle command and is provided to a second summer 122. Another input to the summer 122 is a minimum commutation angle $CA_O$ from a block 124 which is selected according to motor parameters. This is the commutation angle which is used initially at startup. Otherwise, the commutation angle command is equal to the value determined by the compensation unit 120 plus the value $CA_O$. The output of the second summer 122 is coupled to a limit function 126 which develops the commutation angle command on the line 104. The limit function 126 prevents the control system from operating in an unstable region, which can occur if the commutation angle command exceeds the maximum angle. This maximum angle is a function of speed and motor parameters.

The excitation inverter control 78 controls motor field current in a closed loop fashion in accordance with the reactive power to provide unity power factor control. An excitation inverter current reference is developed by a compensation unit 128 which receives the reactive power signal on the line 87 from the reactive power detector 86, see FIG. 3. This reference is applied to a third summer 130 which also receives the excitation current signal on the line 84 from the current sensor 85, see FIG. 3. The third summer 130 subtracts the excitation current signal on the line 84 from the reference developed by the compensation unit 128 to develop an excitation current error on a line 132. The error on the line 132 is provided to a compensation unit 134 which contains a proportional integral algorithm, the output of which is a voltage reference on a line 136 to a PWM generator 138.

The excitation inverter control 78 controls field current in the motor 12 and is controlled by varying the duty cycle of PWM signals from the PWM generator 138. Specifically, the PWM generator 138 develops the base drive command signals on the line 90 for controlling the excitation inverter 48, see FIG. 3. The duty cycle is proportional to the voltage reference which is applied to the PWM generator 138 on the line 136.

The operation of the GCCU 22 illustrated in FIG. 6 is now described with reference to the curves shown in FIG. 5. In an exemplary embodiment of the invention, the motor armature current reference 106 is set to a constant. The duty cycle detector is selected to sense a duty cycle of, for example, 0.9.

At the beginning of the start motoring mode of operation, i.e., the speed is zero, the commutation angle command on the line 104 is determined by the constant $CA_0$, since the compensation unit 120 is effectively disabled by the duty cycle detector 114 opening the switch 118. This is due to the fact that at startup the duty cycle is zero. The duty cycle, represented by the voltage command on the line 102, gradually increases from 0 to 1.0. Specifically, the motor armature current reference is a constant. Initially, the actual current signal on the line 80 is zero. Therefore, the current error on the line 112 is initially at a high level, and the compensation unit 110 ramps the voltage command on the line 102. Owing to the above-described relationship between current, voltage, speed and synchronous reactance, the voltage increases generally proportionally with speed using closed loop current control to main constant current. Thus, the duty cycle ramps in a generally linear manner from 0 to 1.0.

As motor operation approaches the constant power mode, i.e., the duty cycle surpasses 0.9, the duty cycle detector 114 closes the switch 118, allowing the current error on the line 112 to be applied to the compensation unit 120 via the multiplier 116. The multiplier 116 permits smooth transition between constant torque mode and constant power mode by multiplying the duty cycle, which is increasing linearly, by the current error.

At speeds above the base speed, the duty cycle remains generally a constant at 1.0. Therefore, the voltage is no longer controllable and it is necessary to control the commutation angle command on the line 104 to control current. According to the present invention, the region over which the output power is constant can be widened by increasing the commutation angle command on the line 104 in the field weakening region via closed loop current control. This is due to the fact that an increase in the commutation angle command on the line 104 causes as increase in current, and vice versa. Otherwise, the power will decrease for a given torque angle.

The excitation inverter control 78 controls field power in a closed loop manner to maintain unity power factor control using field weakening, as discussed above.

The GCCU 22 described herein is preferably implemented utilizing a programmed microprocessor. Alternatively, the GCCU 22 can be implemented with suitable electrical or electronic controls, as necessary or desired.

Thus, the invention broadly comprehends a start control system for a brushless DC machine which permits constant power characteristics in the field weakening range.

I claim:

1. A start control system for a brushless DC machine including a field coil and having a rotor and a stator having a stator coil which is controllably energized from a source of DC power defining a positive and a negative DC voltage for imparting rotation to the rotor, comprising:

means for sensing the rotational position of the rotor;

switching means coupled between the source of DC power and said stator coil for alternately applying the positive and negative voltage to the stator coil according to the rotational position of said rotor;

means for developing a stator current reference signal representing a desired stator current level;

means for generating an actual stator current signal representing actual current level through the stator coil;

first control means for developing a duty cycle command for controlling the duty cycle of operation of said switching means;

second control means coupled to said developing means, said generating means, said switching means and said first control means for modifying the rotational position at which the positive and negative voltages are applied to the stator coil according to a difference between said desired and actual stator current levels if the duty cycle command is above a select level; and means for sensing reactive power in the stator coil and means coupled to said sensing means for controllably energizing the field coil in accordance with said reactive power to maintain unity power factor operation.

2. A start control system for a brushless DC motor including a field coil and having a rotor and a stator having a stator coil which is controllably energized from a source of DC power defining a positive and a negative DC voltage for imparting rotation to the rotor, comprising:

means for sensing the rotational position of the rotor;

switching means coupled between the source of DC power and the stator coil for alternately applying the positive and negative voltage to the stator coil according to the rotational position of said rotor;

means for developing a stator current reference signal representing a desired stator current level;

means for generating an actual stator current signal representing actual current level through the stator coil;

first control means coupled to said developing means, said generating means and said switching means for controlling a duty cycle of the switching means for applying said positive and negative voltages to said stator coil according to a difference between said desired and actual stator current levels;

second control means coupled to said developing means, said generating means, said switching means and said first control means for modifying the rotational position at which the positive and negative voltages are applied to the stator coil according to a difference between said desired and actual stator current levels if a duty cycle command is above a select level; and means for sensing reactive power in the stator coil and means coupled to said sensing means for controllably energizing the field coil in accordance with said reactive power to maintain unity power factor operation.

* * * * *